H. V. & A. G. RILEY.
DEVICE FOR RE-FORMING FRUIT JAR COVERS.
APPLICATION FILED APR. 17, 1917.
1,272,105.
Patented July 9, 1918.
2 SHEETS—SHEET 1.
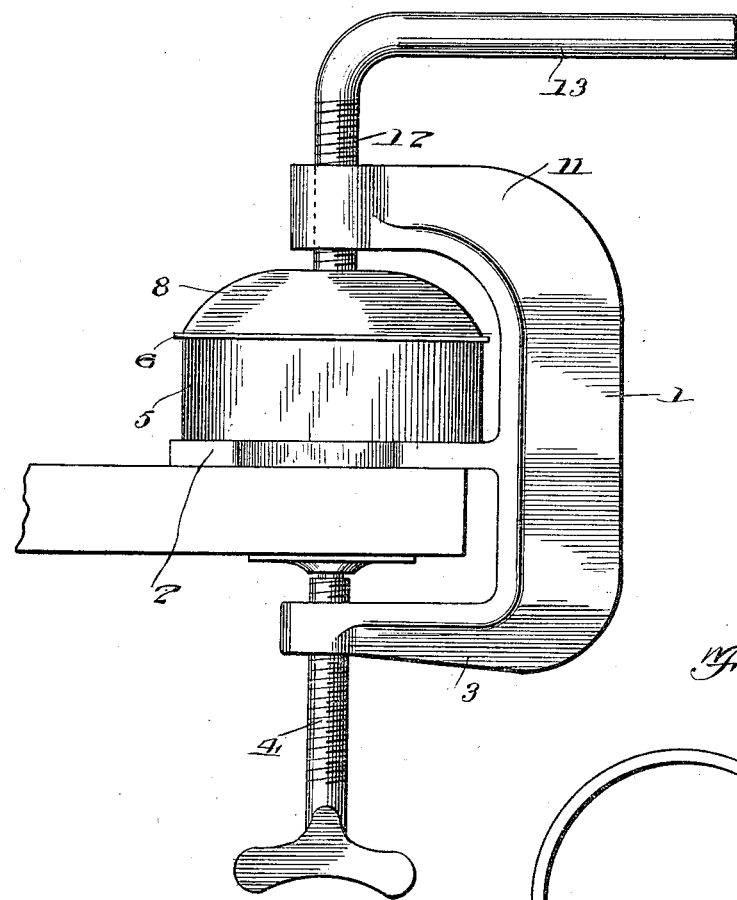
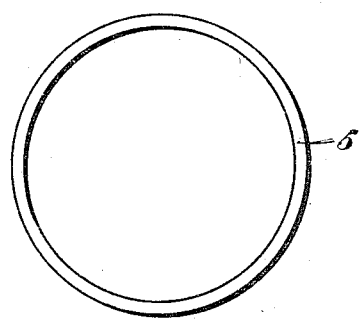
WITNESSES
INVENTOR
H. V. Riley,
A. G. Riley.
BY Victor J. Evans
ATTORNEY

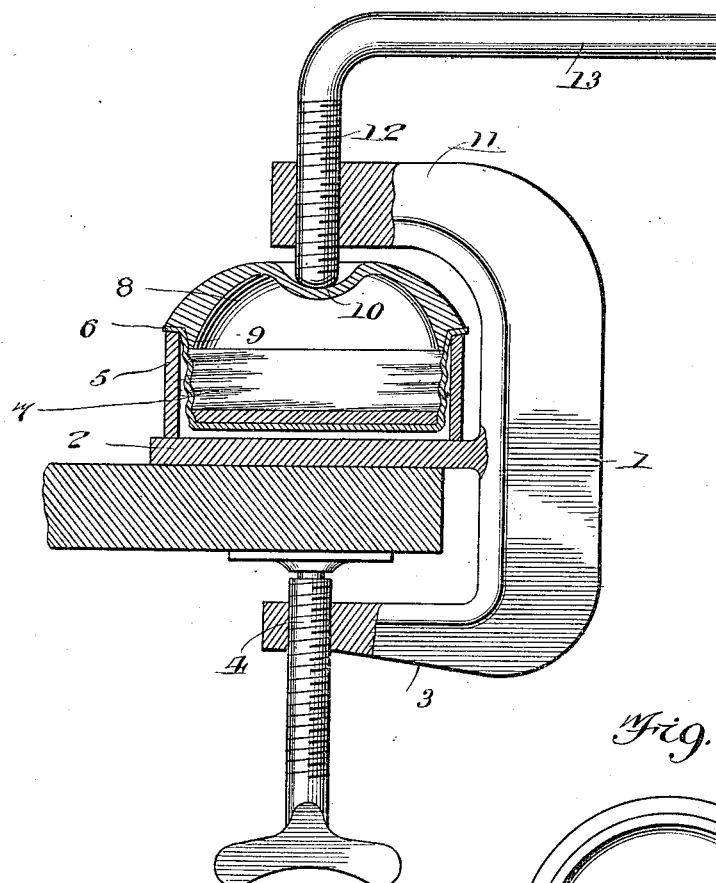
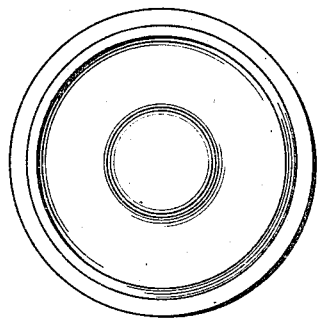

UNITED STATES PATENT OFFICE.

HOWARD V. RILEY AND ALBERT G. RILEY, OF FLINT, MICHIGAN.

DEVICE FOR RE-FORMING FRUIT-JAR COVERS.

1,272,105.  Specification of Letters Patent.  Patented July 9, 1918.

Application filed April 17, 1917. Serial No. 162,643.

*To all whom it may concern:*

Be it known that we, HOWARD V. RILEY and ALBERT G. RILEY, citizens of the United States, residing at Flint, in the county of Genesee and State of Michigan, have invented new and useful Improvements in Devices for Re-Forming Fruit-Jar Covers, of which the following is a specification.

Our invention relates to a device for reforming fruit jar covers and relates particularly to a device of this character adapted to reform the sealing flange of covers which are used in those fruit jars commonly known as "Mason" fruit jars.

It is very often the case when a fruit jar of this type is opened after having stood for a long period that the rubber gasket between the sealing shoulder of the jar adheres to both the cover and the jar. In removing the cover under these conditions the sealing flange of the cover is often bent and rendered useless.

The primary object of our invention is to provide a device for reforming the sealing flange of fruit jar covers of this type so that they may be used again.

A further object of our invention is to provide a device of this character which has means thereon for conveniently clamping the same to a table top, the arrangement of the parts being such that the device is very compact in form and capable of performing its prescribed functions in a very efficient manner.

With these and other objects in view which will be hereinafter fully described and particularly pointed out in the claim, the invention consists in the novel construction and arrangement of parts illustrated in the accompanying drawings forming a part of this specification, in which:—

Figure 1 is a side elevation of a device for reforming fruit jar covers embodying our invention, Fig. 2 is a partial sectional view of the mechanism illustrated in Fig. 1, Fig. 3 is a top plan view of the forming ring of the device, Fig. 4 is a bottom plan view of the forming disk of the device.

Like characters of reference indicate like parts in the various views.

In the drawings 1 designates a frame. This frame is substantially U-shaped and has a base 2 formed on the frame and extending across the inclosure of the opposite arms of the same. The lower arm 3 of the frame has a screw threaded hole therein, which is engaged by a clamp screw 4, said clamp screw coöperating with the under surface of the base to form a clamp. By means of this clamp the device may be conveniently clamped to a projecting top of a table. A ring 5 is provided having its lower edge adapted to rest upon the upper surface of the base 2. The upper edge of the ring is shaped to conform with the outer surface of the sealing flange 6 of a fruit jar cover 7 of the character described, the depth of the ring being such that when the cover 7 is placed within the ring upside down the sealing flange thereof will engage the upper edge of the sealing flange of the ring and be supported thereby. It will be noted that the ring 5 may be formed integrally with the upper surface of the base, but in the preferred embodiment of the invention we form it separately from the base so that the covers may be easily removed from within the ring. A disk 8 is provided having an annular flange 9 formed on one side thereof. The outer periphery of the flange 9 and the adjacent surface of the disk are shaped to conform with the inner surface of the sealing flange 6 of the cover. The disk 8 is preferably arched upwardly and has a depression 10 with the upper surface thereof concentric with the flange 9. The upper arm 11 of the frame has an actuating screw 12 screw threaded therein, said actuating screw having its lower end shaped to engage the depression 10 of the disk and to press the disk 8 down upon the ring 5 when the screw is rotated in the proper direction. A handle 13 is provided on the upper end of the screw 12 for the convenient manipulation thereof.

In the operation of the device the actuating screw 12 is screwed outwardly to allow the ring and the disk 5 to be properly placed upon the base of the frame. A fruit jar cover, which is to be reformed, is placed upside down within the ring 5 with the outer surface of its sealing flange engaging the upper edge of the ring. The disk 8 is then placed upon the cover with the flange 9 within the inclosure of the cover. In this assembly, the ring and disk and the cover are placed upon the base as before described, and the actuating screw is then screwed downwardly into the depression 10 and the parts clamped together. As the disk is clamped down upon the ring the flange of the cover is stretched out and forced to conform with the engaging surfaces of the ring and the disk. The actuating screw is then retracted and the cover removed from the device by lifting the disk and removing the cover from the ring.

It will be noted that, by reason of the fact that the clamp screw 4 and the clamp screw 12 are positioned to clamp against the opposite surfaces of the base, the base is supported by the lower arm 3 when the device is clamped upon a table top as before described, and the combined strength of the base and the lower arm 3 resist the force of the actuating screw 12, and as a result the device does not have to be constructed as strongly as otherwise would be the case.

Having thus fully described our invention, we claim:—

A device for reshaping jar covers comprising a frame having a fixed base portion provided with a smooth upper surface and means coöperating with the base portion to hold the frame in position upon a support, a screw threaded in the frame above the base portion and located approximately centrally thereof and having a rounded lower end, a ring resting loosely on the upper smooth surface of the base portion, a dome shaped disk having in the vicinity of its edge and at its lower side an annular flange the outer surface of which is beveled, the diameter of the ring being greater than that of the flange whereby the ring may receive the flange, the disk being provided at its upper side with a concaved depression which is centrally located with relation to the said flange and adapted to receive the rounded lower end of the screw and a clamp screw passing through the frame at the opposite side of the base portion from the first mentioned screw, said screws having their active end portions in alinement with each other.

In testimony whereof we affix our signatures.

HOWARD V. RILEY.
ALBERT G. RILEY.

Copies of this patent may be obtained for five cents each, by addressing the "Commissioner of Patents, Washington, D. C."